Figure 1:
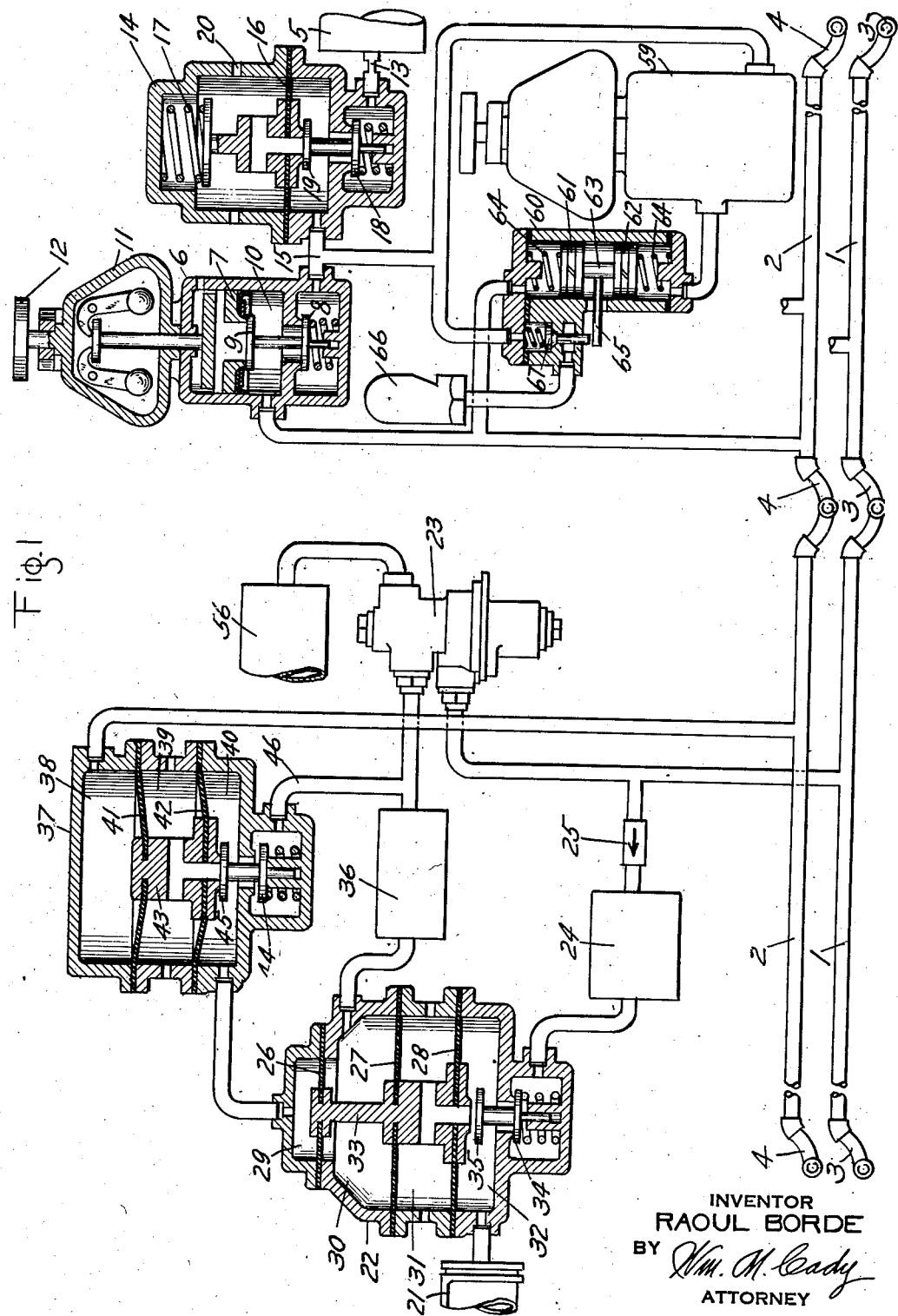

Feb. 28, 1939.　　　　R. BORDE　　　　2,148,725
SPEED CONTROLLED BRAKE
Filed March 3, 1937　　　4 Sheets-Sheet 1

INVENTOR
RAOUL BORDE
BY Wm. M. Cady
ATTORNEY

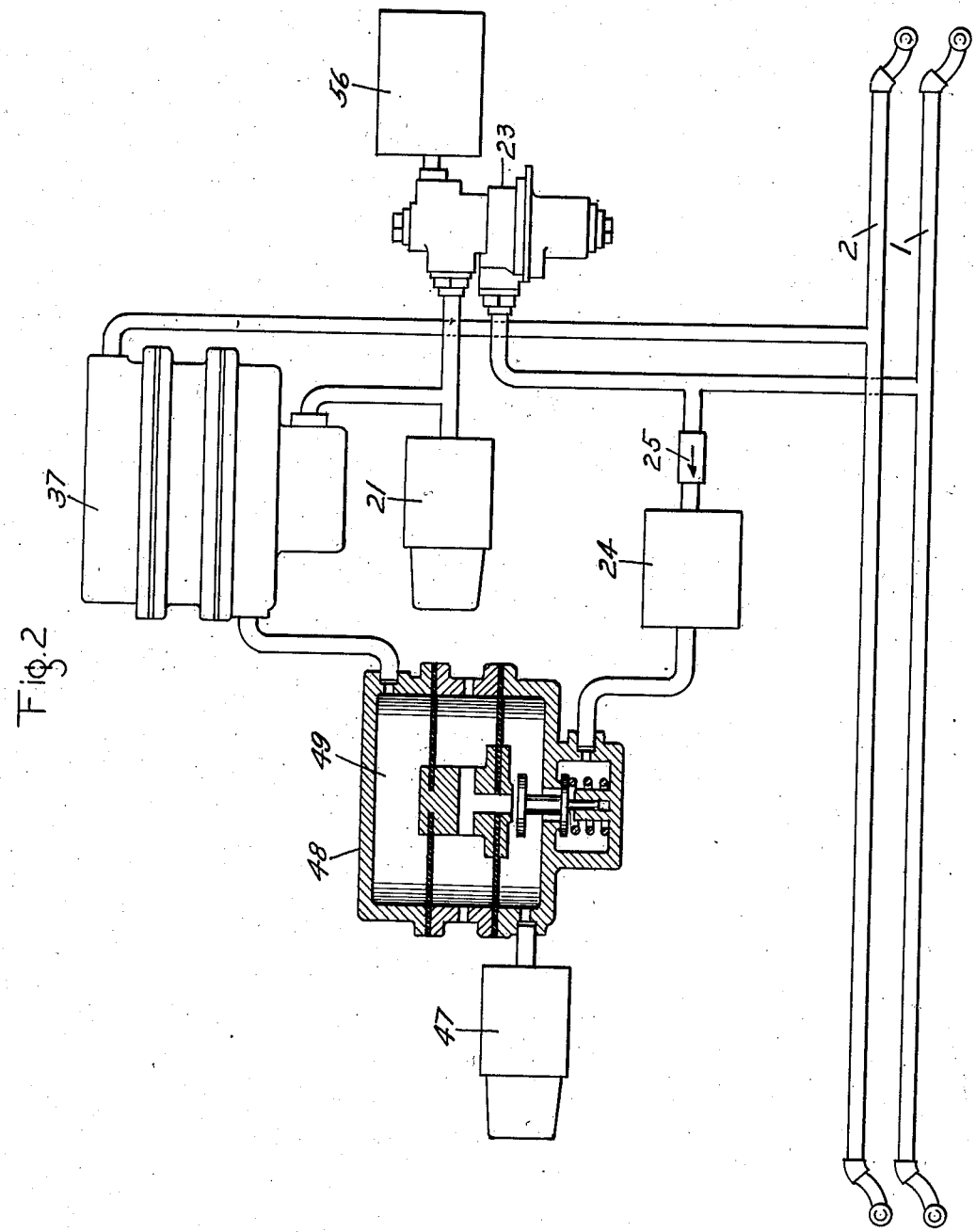

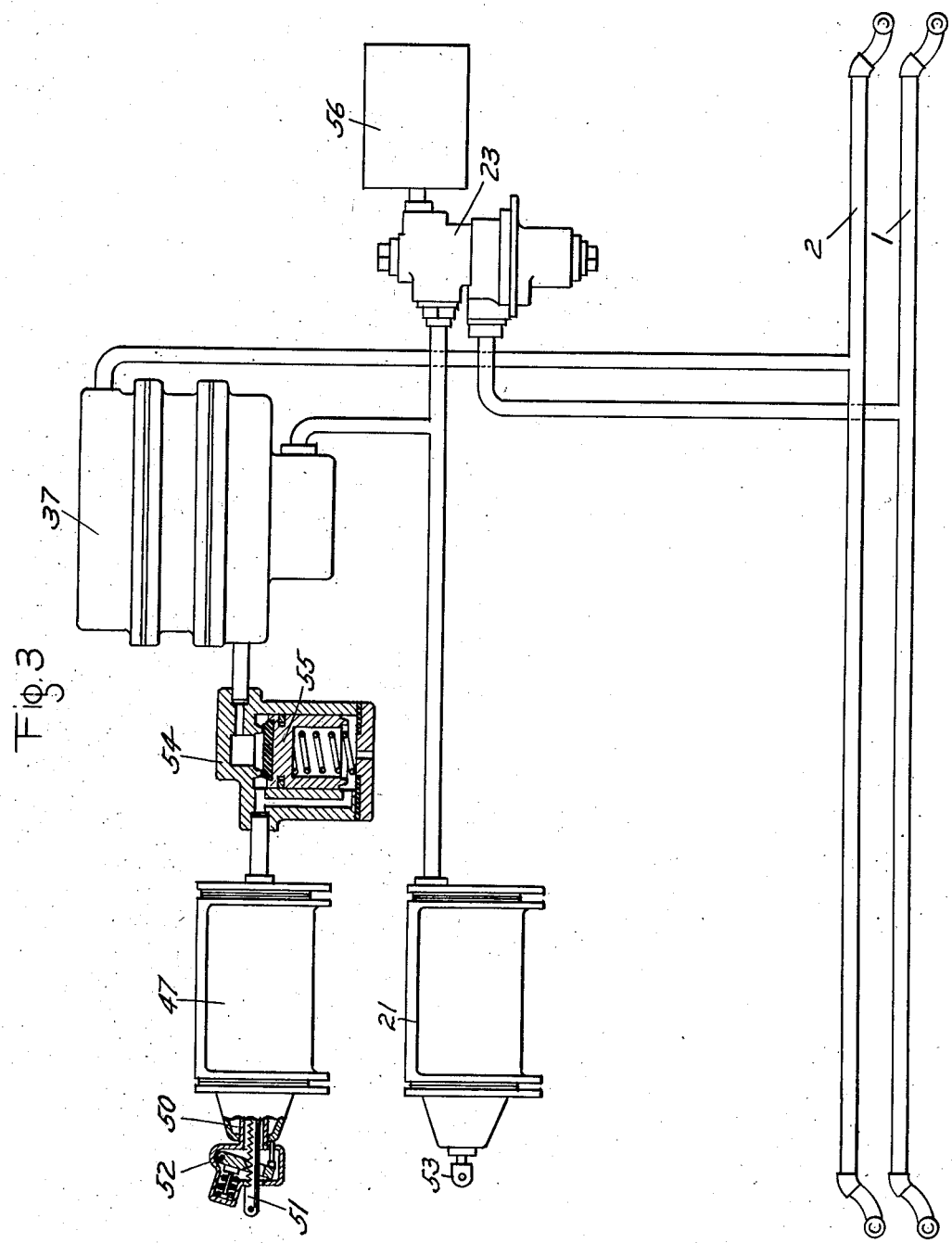

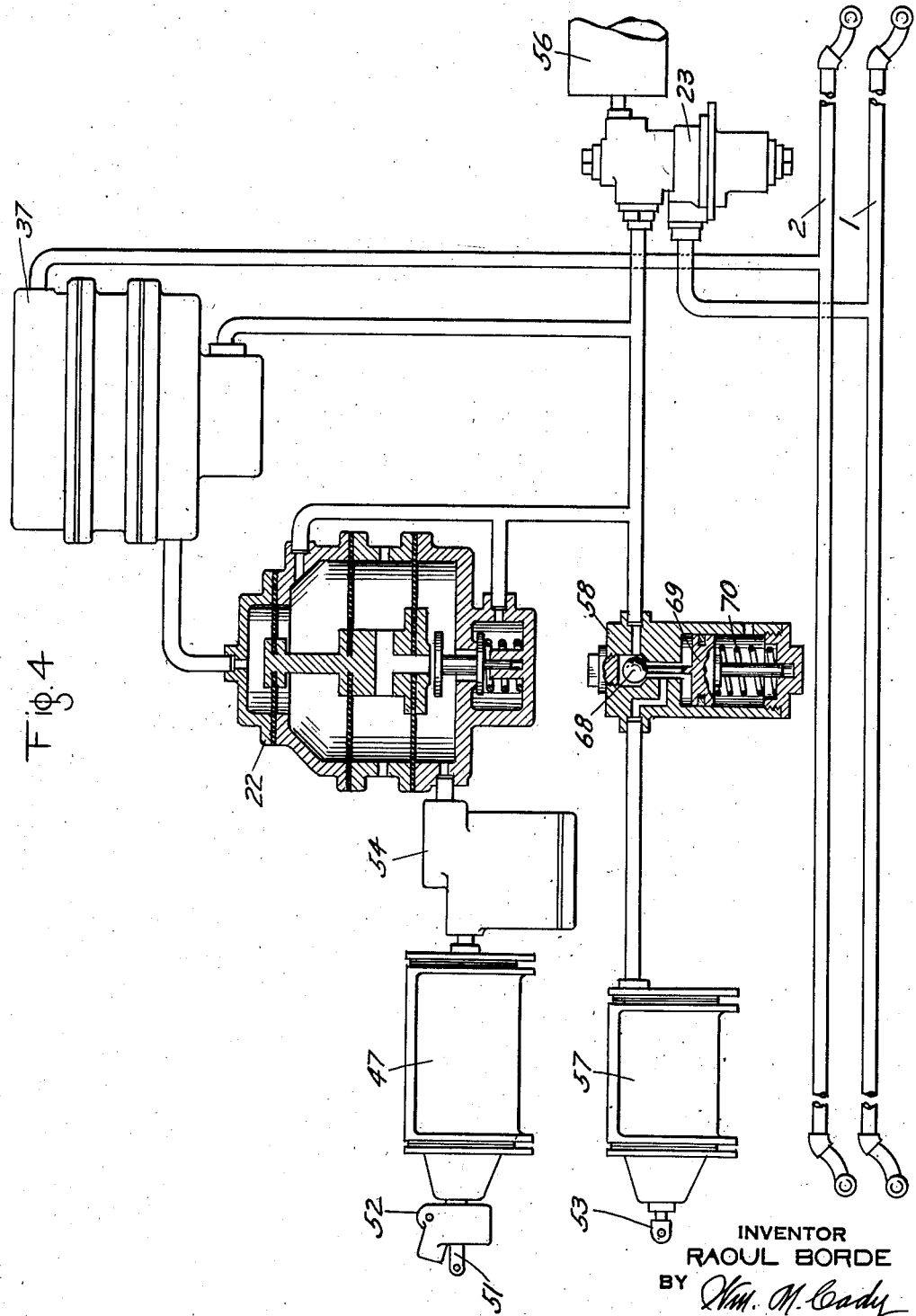

Patented Feb. 28, 1939

2,148,725

UNITED STATES PATENT OFFICE 2,148,725

SPEED CONTROLLED BRAKE

Raoul Borde, Paris, France, assignor, by mesne assignments, to Westinghouse Air Brake Company, Pittsburgh, Pa., a corporation of Pennsylvania Application March 3, 1937, Serial No. 128,759
In Great Britain April 21, 1936

21 Claims. (Cl. 303—21)

This invention relates to fluid pressure braking apparatus for railway trains, and more particularly to the type in which the degree of braking of the vehicles is adapted to be varied in accordance with a variable operating condition thereof.

The principal object of the invention is to provide a brake system of the above type embodying improved means for automatically varying the braking action on each vehicle of a train in accordance with a variable operating condition of the vehicle, such as speed.

According to this object an additional or control brake pipe is provided extending throughout the train through the medium of which the braking action on each vehicle of the train is adapted to be controlled in accordance with the pressure conditions obtaining therein, these conditions being automatically controlled in accordance with a variable operating condition of the train, such as the speed, by a device controlled by the variable operating condition and located at any suitable point in the train. This automatic control is supplementary to the normal control effected through the ordinary brake pipe under the control of the operator and is arranged to be effective throughout the whole or any desired portion of the full range of braking action effected under the control of the operator.

The invention is illustrated by way of example in the accompanying drawings of which Fig. 1 is a diagrammatic view of one form of fluid pressure braking apparatus embodying the invention, and Figs. 2, 3, and 4 are views similar to a portion of Fig. 1 illustrating various modified forms of fluid pressure braking apparatus embodying the invention.

As shown in Fig. 1 of the drawings, the braking system for a train of vehicles comprises the usual automatic brake pipe 1 and an additional brake pipe 2 hereinafter termed the speed control brake pipe, the brake pipes 1 and 2 extending throughout the train with the usual flexible couplings 3, 4, respectively, between the several vehicles of the train.

The speed control brake pipe 2 is arranged to be supplied with fluid under pressure from a reservoir 5 on one vehicle of the train for example the locomotive, through a speed controlled, centrifugally actuated control valve 6 of the self-lapping type comprising as shown a movable abutment 7 adapted to operate supply and release valves 8, 9, respectively, and subject to the opposing actions of the pressure in a chamber 10 communicating with the speed control pipe 2 and the pressure exerted by a centrifugal device 11 driven by means of a pulley 12 from the vehicle axle so as automatically to maintain a pressure in the control pipe 2 which is dependent upon the speed of the train. A choke 13 and a pressure limiting valve device 14 are interposed in the communication between the reservoir 5 and a pipe 15 leading to the centrifugally actuated control valve device 6.

The valve device 14 preferably comprises a flexible diaphragm 16 subject to the opposing pressures of a control spring 17 and of the fluid in the pipe 15, the diaphragm 16 being arranged to control an inlet valve 18 and an exhaust valve 19 in such a manner that when a predetermined pressure exists in the pipe 15 and the chamber in the valve device 6 communicating therewith the diaphragm 16 is moved upwards against the action of the spring 17 to permit the valve 18 to close. The closure of the valve 18 cuts off the supply of fluid under pressure from the reservoir 5 to pipe 15 and if, for any reason, the pressure in said pipe is sufficient to cause further movement of the diaphragm 16 against spring 17, the valve 19 is unseated to release fluid from the pipe 15 to the atmosphere through a port 20 until the pressure in said pipe just balances the pressure of spring 17 when both of the valves 18 and 19 are seated. In this manner the pressure of the fluid supplied through the pipe 15 to the valve device 6 is definitely limited to a maximum value corresponding to the pressure exerted by the spring 17.

On each vehicle of the train the supply of fluid under pressure to and its release from the brake cylinder 21 is arranged to be controlled by a differential relay valve device 22 subject to the opposing actions of the pressure supplied to the device 22 through a triple valve 23 under the control of the ordinary brake pipe 1 and of the pressure in the brake cylinder 21, relay valve device 22 effecting the supply of fluid under pressure to the brake cylinder 21 from a reservoir 24 which is charged from the ordinary brake pipe 1 through a non-return valve 25, the valve device 22 also controlling the release of fluid from the brake cylinder 21 to the atmosphere.

The relay valve device 22 comprises flexible diaphragms 26, 27, 28 subdividing the interior of the casing of the device into corresponding chambers 29, 30, 31 and 32, the diaphragms being connected together by a stem 33 and arranged to control an inlet valve 34 and an exhaust valve 35. The valve 34 controls communication between the reservoir 24 and the chamber 32 which is in open communication with the brake cylinder 21 while the valve 35 controls communication between the chamber 32 and the chamber 31 which is open to the atmosphere. The chamber 30 is in communication with a reservoir 36 forming an extension thereof, fluid under pressure being supplied to the reservoir 36 and chamber 30 during an application of the brakes from the auxiliary reservoir 56 through the triple valve 23.

The chamber 29 of the relay valve device 22 is arranged to be supplied with fluid under pressure through a relay valve device 37 termed the speed control valve and comprising a casing subdivided into chambers 38, 39, 40 by flexible diaphragm 41, 42 secured to a stem 43 and adapted to operate an inlet valve 44 and an exhaust valve 45. The chamber 38 communicates with the speed control pipe 2, the chamber 40 communicating with the chamber 29 of the relay valve device 22. The inlet valve 44 controls communication between a pipe 46 leading to the triple valve 23 and the chamber 40, the exhaust valve 45 controlling communication between the chamber 40 and the chamber 39 which is open to the atmosphere.

The operation of the apparatus as so far described is as follows:

When an application of the brakes is effected in the usual manner by a reduction of pressure in the brake pipe 1, fluid under pressure is supplied from the auxiliary reservoir 56 through the triple valve 23 to the reservoir 36 and chamber 30 of the valve device 22. The pressure of fluid in the chamber 30 assisted by that in the chamber 29 moves the diaphragms of the valve device 22 downward and thus causes the exhaust valve 35 to close and the inlet valve 34 to open. The pressure in the chamber 29 of the valve device 22 is determined by the action of the speed control valve 37, this chamber being supplied with fluid from the chamber 40 of the valve 37 which is supplied with fluid from the pipe 46 through the valve 44. The valve 44 is normally opened by the action of the fluid pressure in the chamber 38 which in turn is dependent upon the pressure in the speed control pipe 2 as controlled by the operation of the centrifugal device 11. When the brakes are applied therefore fluid under pressure is supplied to the chamber 40 of the valve device 37 and to the chamber 29 of the valve device 22 until the pressure in these chambers acting on the diaphragm 42 is equal to the pressure in the chamber 38 and in the control pipe 2 whereupon the valve 44 will be permitted to close so as to retain a pressure in the chamber 29 of the valve device 22 which corresponds to the pressure in the control pipe 2 and is thus dependent upon the speed of the train.

When the pressure obtained in the brake cylinder 21 and acting in chamber 32 on diaphragm 28 of the relay valve device 22 builds up sufficiently to overcome the opposing pressures of fluid in chambers 29 and 30 acting on the diaphragms 26 and 27, the diaphragms of said device are moved upwardly which permits the supply valve 34 to seat and thus limit the supply of fluid under pressure to the brake cylinder.

As the speed of the train reduces after the brakes have been applied, the centrifugal device 6 acts to effect a corresponding reduction in pressure in the speed control pipe 2 and diaphragm chamber 38 in the speed control valve 37, and this permits the pressure of fluid in chamber 40 to move the diaphragms 41 and 42 upwardly, unseating the release valve 45 and thereby permitting the pressure of fluid in chambers 40 and 29 to reduce substantially with the reduction in pressure in chamber 38, and as the pressure in chamber 29 is thus reduced, the relay valve device 22 operates to correspondingly reduce the pressure of fluid in brake cylinder 21 by way of the release valve 35.

It will thus be evident that during an application of the brakes the pressure obtaining in the brake cylinder 21 of each vehicle is controlled by the differential relay valve device 22 under the combined control of the triple valve 23 and of the speed control valve 37 and is thus dependent upon the pressure obtaining in the ordinary brake pipe 1 which is under the control of the operator, in the usual manner, and on the pressure in the speed control pipe 2 which is under the control of the centrifugally actuated speed control valve 6.

As the speed of the train is increased the pressure obtaining in the speed control pipe 2 is automatically increased by operation of the centrifugal device 11 up to a predetermined limit determined by the valve device 14, so that when an application of the brakes is effected, the pressure obtained in the brake cylinder on each vehicle is correspondingly varied by the action of the pressure in the speed control pipe 2 on the speed control valve 37 and the differential relay valve device 22. This automatic control in accordance with the speed is thus superimposed upon the normal manual control due to the ordinary brake pipe 1 until at a predetermined relatively high speed where the pressure in the speed control pipe 2 is limited by the valve device 14 instead of the centrifugal device 11 the automatic control is no longer effective and the control of the brake cylinder pressure is thereafter effected by the action of the triple valve 23 only through the differential relay valve device 22 in the ordinary manner this being the case since the pressure in the speed control pipe, as limited by the device 14 and acting in chamber 38 of the speed control valve 38, sufficiently exceeds that supplied by the brake valve device to chamber 40 as to maintain the valve 44 open and thus render the diaphragm 26 in the device 22 ineffective to influence the operation of said device.

Arrangements are associated with the brake equipment shown in Fig. 1 of the drawings for giving an indication on the locomotive or at any other desired point in the train in the event of the speed control pipe 2 becoming broken or injured so that the proper pressure therein is no longer maintained. One form of arrangements for this purpose comprises an additional centrifugally actuated control valve device 59 similar to the valve device 6 and adapted to supply from pipe 15 fluid at a pressure which varies in accordance with the speed of the train to an indicator control device 60.

The latter comprises two movable abutments 61, 62 connected together by a stem 63 and adapted to be normally maintained in the central position shown by means of controlling springs 64. The outer side of the abutment 61 is in communication with the speed control pipe 2 and the outer side of the abutment 62 is supplied with fluid under pressure from the valve device 59. The stem 63 of the device is provided with an arm 65 which is arranged when displaced upwards from its normal position to effect the operation of any suitable signal device, such as a whistle 66, the operation of the device being as follows:—

Under normal conditions of operation so long as the pressure in the speed control pipe 2 is being maintained by the action of the device 6 at a value which is dependent upon the speed of the train up to the limit determined by the valve device 14 as above explained the pressure acting on the outer side of the abutment 61 will be equal to the pressure acting on the outer side of the abutment 62 due to fluid supplied through the device 59. Under these conditions the connected abutments 61, 62 will be subject to equal and opposite pressures and will accordingly be maintained in their central position shown by the controlling springs 64. In the event however of the speed control pipe 2 becoming broken or leaking, the consequent reduction in the pressure acting on the outer side of the abutment 61 will cause the abutments to move upward under the higher pressure maintained at the outer side of the abutment 62 by the action of the device 59 and the arm 65 will therefore move to a position to unseat the valve 67 to supply fluid under pressure from pipe 15 to the whistle 66 for effecting operation thereof and thus notify the operator of the vehicle of the abnormal condition of the speed control pipe 2.

It will be evident that if the speed control pipe 2 becomes ruptured an excessive loss of fluid from the reservoir 5 from which the centrifugally actuated control devices 6 and 59 are supplied with fluid under pressure is prevented by the choke device 13 interposed in the outlet from the reservoir 5.

Referring now to the modification illustrated in Fig. 2 it will be seen that each vehicle is provided with an ordinary brake cylinder 21 controlled by the triple valve 23 in the usual manner and with an auxiliary or speed controlled brake cylinder 47 the supply of fluid to and its release from which is arranged to be controlled by a relay valve device 48 similar in construction and operation to the valve device 37 above described with reference to Fig. 1. The chamber 49 of the valve device 48 is arranged to be supplied with fluid under pressure through a speed control valve 37 so that the action of the valve device 48 is dependent upon the pressure in the speed control brake pipe 2 as above described. With this arrangement it will be understood that the braking action on the vehicle is due to the combined action of the ordinary brake cylinder 21 and the auxiliary brake cylinder 47, the action of the former being under the sole control of the operator through the ordinary brake pipe 1 while the action of the brake cylinder 47 is under the control of the pressure in the speed control brake pipe 2 as determined by the centrifugally actuated relay valve device 6 on the locomotive or other selected vehicle of the train.

Referring now to the modified arrangement illustrated in Fig. 3 it will be seen that the auxiliary brake cylinder 47 is the well known type in which the brake cylinder piston rod 50 is adapted to be coupled to a notched piston rod 51 through a clutch device 52 so that during an application of the brakes the piston rod 50 will remain stationary within the cylinder 47 until the usual brake shoes (not shown) have been applied to the wheels of the vehicle by the action of the ordinary brake cylinder 21, the outward movement of the piston rod 53 of this cylinder effecting in the well known manner, through the brake rigging, a corresponding outward movement of the piston rod 51 of the auxiliary brake cylinder 47. The supply of fluid under pressure to the brake cylinder 47 from the triple valve 23 is effected through the speed control valve 37 controlled from the speed control brake pipe 2 and an economiser valve device 54 is interposed between the auxiliary brake cylinder 47 and the control valve 37. The economiser valve device 54 comprises a spring controlled valve 55 adapted to prevent the supply of fluid under pressure to the brake cylinder 47 until the pressure of fluid supplied from the control valve 37 attains a predetermined value sufficient to have effected operation of the brake cylinder 21 to take up the slack in the brake rigging. Then the valve 55 is unseated to supply fluid under pressure to the auxiliary brake cylinder 47, the initial operation of which causes the latch device 52 to act and thereby limit the stroke of the piston rod 50 of the auxiliary brake cylinder 47 in the usual manner so as to effect a corresponding saving in the amount of fluid under pressure required for operating said auxiliary brake cylinder 47. The further operation of this form of apparatus is similar to that of Fig. 2 and will be readily understood without further description.

In the still further modification illustrated in Fig. 4 the ordinary brake cylinder 21 of the apparatus shown in Fig. 3 is replaced by a relatively small brake cylinder 57 adapted only to take up slack in the brake rigging and effect the application of the brake shoes to the wheels of the vehicle, the supply of fluid under pressure to the cylinder 57 from the triple valve 23 being effected through a pressure limiting device 58 which is adapted to cut off this supply as soon as a relatively low pressure, of the order of 7 lbs. per sq. in., is established in the brake cylinder 57. This limiting device may comprise a check valve 68 and a piston 69 subject to the opposing pressures of fluid obtained in the brake cylinder 57 and a spring 70, the piston being movable against the spring 70 to permit closing of valve 68 when the predetermined relatively low pressure is obtained in brake cylinder 57 as above described.

The brake cylinder 47 is arranged to be supplied with fluid under pressure through the triple valve 23 under the control of the valve devices 22 and 37 in the manner already described with reference to Fig. 1, an economiser valve device 54 being interposed between the brake cylinder 47 and the valve device 22 as in the apparatus of Fig. 3. The actual braking pressure is thus due to the brake cylinder 47 the pressure in which is under the combined control of the pressures in the ordinary brake pipe 1 and in the speed control brake pipe 2.

While one illustrative embodiment of the invention has been described in detail, it is not my intention to limit its scope to that embodiment or otherwise than by the terms of the appended claims.

Having now described my invention, what I claim as new and desire to secure by Letters Patent is:

1. In a brake system for a train comprising a plurality of vehicles, in combination, a control pipe extending through the train, means controlled by a variable operating condition of the train operative to supply fluid to said pipe at a pressure which varies according to said operating condition, another pipe extending through the train, manually controlled means for controlling the pressure of fluid in said other pipe, and means on each vehicle in the train controlled jointly by the pressure of fluid in both pipes for controlling the brakes on that vehicle.

2. In a brake system for a train comprising a plurality of vehicles, in combination, a pipe extending through the train and normally charged with fluid under pressure, means on one vehicle of the train controlled by a variable operating condition and operable in accordance therewith to vary the pressure of fluid in said pipe, another pipe extending through the train in which the pressure of fluid is adapted to be varied manually, means on each vehicle in the train operative to control the brakes on that vehicle, and valve means on each vehicle in the train operative to control said means to vary the degree of application of brakes on that car in accordance with the pressure of fluid in both of said pipes.

3. In a brake system for a train comprising a plurality of vehicles, in combination, a control pipe extending through the train, means on one vehicle of the train controlled by a variable operating condition of the train operative to supply fluid under pressure to said pipe and to release fluid under pressure from said pipe for thereby varying the pressure of fluid in said pipe in accordance with said operating condition, another pipe extending through the train in which the pressure of fluid is adapted to be controlled manually, and valve means on each vehicle in the train controlled by the pressure of fluid in said pipes and operative upon a variation in the pressure of fluid in said other pipe to effect an application of the brakes on that vehicle the degree of which varies in accordance with the pressure of fluid in said pipes.

4. In a brake system for a train comprising a plurality of vehicles, in combination, a normally charged pipe extending through the train, means on one vehicle of the train controlled by a variable operating condition of the train and operative to vary the pressure of fluid in said pipe in accordance with said condition, another pipe extending through the train in which the pressure of fluid is adapted to be controlled manually, and valve means on each vehicle of the train controlled by the pressure of fluid in both of said pipes and operative upon a variation in pressure in the second mentioned pipe for effecting an application of the brakes on that vehicle the degree of which is controlled by the extent of said variation in pressure in the one pipe and the degree of pressure in the other pipe.

5. In a brake equipment for a train comprising a plurality of vehicles, in combination, two normally charged pipes extending through the train, the pressure of fluid in one of said pipes being controlled manually, means on one vehicle of the train controlled by a variable operating condition of the train for varying the pressure of fluid in the other pipe in accordance with said condition, and means on each vehicle of the train operative to control the brakes on that vehicle in accordance with the pressure of fluid in both of said pipes.

6. In a brake system for a train comprising a plurality of vehicles, in combination, a normally charged control pipe extending through said train, means controlled by a variable operating condition of the train for varying the pressure of fluid in said pipe in accordance with said condition, a brake pipe extending through said train and valve means on each vehicle of the train controlled by the pressure of fluid in both of said pipes and operative upon a reduction in pressure effected in the brake pipe for effecting an application of the brakes on that vehicle the degree of which varies in accordance with the degree of the reduction in brake pipe pressure and the degree of pressure acting in the first mentioned pipe.

7. In a brake system for a train comprising a plurality of vehicles, in combination, two normally charged pipes extending through the train, the pressure of fluid in one of which is adapted to be controlled manually, valve means controlled by a variable operating condition of the train for varying the pressure of fluid in the other pipe in accordance with said condition, a brake controlling valve device on each car in the train operative upon a reduction in fluid pressure in the manually controlled pipe for supplying fluid under pressure to effect an application of the brakes on that vehicle, and valve means on that vehicle controlled by the pressure of fluid supplied by said brake controlling valve device and the pressure of fluid in the pipe controlled by a variable operating condition for effecting an application of the brakes the degree of which varies in accordance with the reduction in pressure in the manually controlled pipe and the degree of pressure in the other pipe.

8. In a brake system for a train comprising a plurality of vehicles, in combination, a control pipe extending through the train, valve means operative to supply fluid under pressure to and release fluid under pressure from said control pipe, means on one vehicle of the train controlled by a variable operating condition of the train for controlling the operation of said valve means to vary the pressure of fluid in said pipe in accordance with said operating condition, another pipe extending through the train in which the pressure of fluid is adapted to be varied manually, and valve means on each vehicle of the train controlled jointly by the pressure of fluid in both of said pipes for controlling the brakes on that vehicle.

9. In a brake system for a train comprising a plurality of vehicles, in combination, a control pipe extending through the train, valve means operative to supply fluid under pressure to and release fluid under pressure from said control pipe, means on one vehicle of the train controlled by a variable operating condition of the train for controlling the operation of said valve means for varying the pressure of fluid in said pipe in accordance with said operating condition, another pipe extending through the train in which the pressure of fluid is adapted to be varied manually, valve means on each vehicle of the train controlled jointly by the pressure of fluid in both of said pipes for controlling the brakes on that car, and means independent of said valve means operative to limit to a predetermined degree the maximum pressure obtainable in the first mentioned pipe by the operation of said valve means.

10. In a brake system for a train comprising a plurality of vehicles, in combination, a control pipe extending through the train, valve means operative to supply fluid under pressure to and release fluid under pressure from said pipe, speed controlled means on one vehicle of the train operative to control the operation of said valve means for thereby varying the pressure in said control pipe in accordance with the speed of the train, another pipe extending through the train in which the pressure of fluid is adapted to be controlled manually, and means on each vehicle of the train controlled by the pressure of fluid in both of said pipes and operative to effect an application of the brakes on that vehicle upon a variation in pressure in the manually controlled pipe.

11. In a brake system for a train comprising a plurality of vehicles, in combination, a control pipe extending through the train, a speed controlled device on one vehicle of the train, valve means controlled by said speed control device operative upon an increase in the speed of the train for supplying fluid under pressure to said control pipe and upon a reduction in the speed of the train for releasing fluid under pressure from said control pipe for thereby varying the pressure of the fluid in said control pipe in accordance with the speed of the train, means for preventing said valve means increasing the pressure in said control pipe when the speed of the train exceeds a predetermined degree, another pipe extending through the train in which the pressure of the fluid is adapted to be controlled manually, and valve means on each vehicle of the train controlled jointly by the pressure of fluid in both of said pipes for controlling the brakes on that car.

12. In a brake system for a train comprising a plurality of vehicles, in combination, a control pipe extending through the train, a speed controlled device on one vehicle of the train, valve means controlled by said speed controlled device operative upon an increase in the speed of the train to supply fluid under pressure to said control pipe and upon a reduction in the speed of the train to release fluid under pressure from said control pipe, means controlling the supply of fluid under pressure to said valve means for supply to said control pipe and operative to cut off said supply when a predetermined pressure is obtained in said control pipe, another pipe extending through the train in which the pressure of fluid is adapted to be controlled manually, and valve means on each car of the train controlled jointly by the pressure of fluid in both of said pipes for controlling the brakes on that car.

13. The combination with a vehicle brake system comprising a control pipe and means controlled by a variable operating condition of the vehicle for varying the pressure of fluid in said pipe in accordance with said operating condition, of a signal device, and mechanism controlled by said variable operating condition and the pressure of fluid supplied by said means and operative automatically upon a reduction in pressure in said control pipe below that called for by said means to effect operation of the signal device.

14. The combination with a vehicle braking system comprising a control pipe and means controlled by a variable operating condition of the vehicle for varying the pressure of fluid in said pipe in accordance with the operating condition, other means controlled by said operating condition for supplying fluid at a pressure which varies with said operating condition, a signal device, and mechanism subject to the opposing pressures of fluid applied by said two means and operative if the pressure of fluid supplied by the one means becomes reduced below that supplied by the other means to effect operation of said signal device.

15. The combination with a vehicle braking system comprising a control pipe and speed controlled valve means operative to vary the pressure in said pipe in accordance with the speed of the vehicle, other speed controlled valve means operative independently of the first mentioned speed controlled valve means for supplying fluid at a pressure which varies according to the speed of the vehicle, a signal device, and valve means subject to the opposing pressures of fluid supplied by the two speed controlled valve means and operative if the pressure of fluid supplied to said pipe by the one speed controlled valve means becomes reduced below that supplied by the other speed controlled valve means to effect operation of said signal device.

16. In a vehicle brake system, in combination, manually controlled means operative to supply fluid at various pressures, mechanism controlled by a variable operating condition of the vehicle for constantly maintaining a pressure which varies in accordance with said condition, valve means controlled by the pressure of fluid maintained by said mechanism and operative upon the operation of said manually controlled means to supply fluid at a pressure proportional to that maintained by said mechanism, and valve means controlled by the pressures of fluid supplied by said manually controlled means and said valve means for effecting an application of the brakes.

17. In a vehicle brake system, in combination, manually controlled means operative to supply fluid at various pressures, mechanism controlled by a variable operating condition of the vehicle for supplying fluid at a pressure which varies in accordance with said condition, valve means constantly subject to the pressure of fluid supplied by said mechanism and controlling a communication through which fluid supplied by said manually controlled means is adapted to be supplied and operative to close said communication when the pressure of fluid supplied through said communication bears a predetermined relation to that supplied by said mechanism, and means controlled by the pressure of fluid supplied by said manually controlled means and said valve means for effecting an application of the brakes.

18. In a vehicle brake system, in combination, means controlled by a variable operating condition of the vehicle operative to vary the pressure of fluid in a chamber in accordance with said condition, manually controlled valve means operative to supply fluid under pressure to two communications for effecting an application of the brakes, a valve device for controlling said supply of fluid under pressure to one of said communications and operative to cut off the supply and to release fluid under pressure from said one communication, and means subject to the opposing pressures of fluid in said chamber and in said one communication for controlling the operation of said valve device, said means being normally operative by the pressure of fluid acting in said chamber to operate said valve device to open said one communication.

19. In a vehicle brake system, in combination, two brake cylinders, a relay valve device operative by fluid under pressure to supply fluid under pressure to one of said brake cylinders, manually controlled valve means operative to supply fluid under pressure to the other brake cylinder and to said relay valve device for effecting the operation thereof, valve means controlling the communication through which fluid under pressure is supplied from said manually controlled means to said relay valve device and operative to close said communication and also operative to release fluid under pressure from said relay valve device for reducing the operating pressure thereon, means controlled by the opposing pressures of fluid supplied for operating said valve device and the fluid pressure in a chamber for controlling the operation of said valve means and normally operative by the pressure of fluid in said chamber to operate said valve means to open said communication, and means controlled by a variable operating condition of the vehicle for varying the fluid pressure in said chamber in accordance with said conditon.

20. In a vehicle brake system, in combination, two brake cylinders, manually controlled valve means operative to supply fluid under pressure to both of said brake cylinders, valve means normally closing the communication from said manually controlled valve means to one of said brake cylinders and operative upon a predetermined increase in fluid pressure in the other cylinder to open said communication, other valve means controlling said communication, means controlled by the opposing fluid pressures in a chamber and in the brake cylinder to which fluid under pressure is supplied through said communication for controlling said other valve means, said means being operative when the pressure of fluid in said chamber exceeds that in the brake cylinder to operate said valve means to open said communication and when the pressure in the brake cylinder is substantially equal to that in said chamber to operate said valve means to close said communication and when the pressure in the brake cylinder exceeds that in said chamber to operate said valve device to vent fluid under pressure from the brake cylinder, and means controlled by a variable operating condition of the vehicle for varying the fluid pressure in said chamber in accordance with the operating condition.

21. In a vehicle brake system, in combination, a cylinder for taking up slack in the brake rigging, a brake cylinder, manually controlled valve means operative to supply fluid under pressure to said slack take-up cylinder, means operative upon a predetermined increase in pressure in said slack take-up cylinder for cutting off the supply of fluid under pressure thereto, means controlled by a variable operating condition of the vehicle and operative upon the operation of said manually controlled valve means to supply fluid under pressure to a chamber at a pressure which varies in accordance with the operating condition, and valve means controlled jointly by the pressure of fluid supplied to said chamber and by the pressure of fluid supplied by said manually controlled valve means for supplying fluid under pressure to said brake cylinder.

RAOUL BORDE.